United States Patent Office 2,898,356
Patented Aug. 4, 1959

2,898,356

ORGANOTITANIUM COMPOUNDS AND PROCESS OF PREPARATION

Charles A. Russell, Fair Haven, N.J., assignor to National Lead Company, New York, N.Y., a corporation of New Jersey No Drawing. Application September 6, 1955
Serial No. 532,779

8 Claims. (Cl. 260—429.5)

This invention relates to organotitanium compounds and to aqueous solutions of such compounds. More particularly, it relates to organotitanium compositions which are stable in aqueous, alkaline media.

Various organic salts of titanium have been prepared in the past and among these are chelated titanium salts of alpha hydroxy acids. Such organotitanium compounds are particularly useful in the textile, leather and cosmetic industries. Most of these salts are soluble in acidic aqueous solutions but only a few are soluble at pH above 6. It has been found that the use of these salts in general is not possible when they are to be used in solutions having an alkaline pH, since these particular compounds are not stable. At pH ranges above 9.0 they hydrolyze readily to form insoluble hydrated oxides and they usually hydrolyze at elevated temperatures and upon high dilution even at pH's as low as 5.0.

An object of this invention, therefore, is to prepare solutions of organotitanium compositions which are stable at a pH range above 9.0. Another object is to prepare solutions containing titanium salts of alpha hydroxy acids which are stable in alkaline aqueous media at high dilution. A still further object is to prepare organotitanium compositions which are stable in alkaline aqueous media at elevated temperatures. These and other objects of the instant invention will become apparent from the following more complete description of the invention.

Broadly, this invention contemplates a stabilized solution comprising a chelated titanium salt of an alpha hydroxy acid and a polyol, said polyol containing at least 3 hydroxy groupings and at least 3 carbon atoms, said hydroxy groupings being present on adjacent carbon atoms, the mole ratio of the titanium to the alpha hydroxy acid in said salt being from 1:1 to 1:4, the mole ratio of the titanium salt to the polyol in said solution being from 1:0.1 to 1:2, said polyol being selected from the group consisting of polyhydroxy aliphatic alcohols, polyhydroxy alicyclic alcohols and derivatives of said alcohols, said solutions being stable in alkaline aqueous media.

This invention further contemplates a method for the preparation of a stabilized solution of chelated titanium salts of an alpha hydroxy acid in alkaline aqueous media which comprises admixing a chelated titanium salt of an alpha hydroxy acid with a polyol, said polyol containing at least 3 hydroxy groupings and at least 3 carbon atoms, said hydroxy groupings being present on adjacent carbon atoms, said polyol being selected from the group consisting of polyhydroxy aliphatic alcohols, polyhydroxy alicyclic alcohols and derivatives of said alcohols.

The chelated titanium salt of an alpha hydroxy acid may be prepared by a number of methods well known in the art. They may be prepared for example, by reacting an alkyl ester of orthotitanic acid with an alpha hydroxy acid or by reacting a titanium salt of an inorganic acid with an alpha hydroxy acid. The chelated titanium salt of alpha hydroxy acid can vary in composition from 1 to 4 moles of alpha hydroxy acid for each mole of titanium. These chelated titanium salts usually act as weak acids and concentrated solutions of some of these salts can be neutralized readily without hydrolizing up to a pH of 8.0. However, many of these neutralized salts hydrolyze readily upon dilution or upon heating.

The alpha hydroxy acid in said chelated titanium salt may be a simple alpha hydroxy acid such as for example, glycolic, lactic, alpha hydroxybutyric and the like, or it may contain aromatic groupings such as for example, mandelic acid and the like or may contain other carboxyl or hydroxyl groups such as for example, malic, citric, tartaric acids and the like.

The polyols employed in said composition stabilize the chelated titanium salts in an alkaline aqueous media and also increase the resistance of the chelated titanium salts to hydrolysis by dilution or heat.

The polyols employed in the composition should contain at least 3 and no more than 8 hydroxyl groups and, therefore, should contain at least 3 and not more than 8 hydroxy bearing carbon atoms, the hydroxy groupings being present on adjacent carbon atoms. Such polyols which are most satisfactory to use in the instant invention include the 6 carbon straight chained hexahydroxy polyols, such as sorbitol, mannitol, dulcitol and the like, hexoses, such as glucose, mannose and derivatives of the hexoses, such as glucosides, glucamines, gluconic acids and the like. In the instant invention any of the polyols or their derivatives should contain at least 3 hydroxy groups attached to adjacent carbon atoms.

In order to more fully illustrate the instant invention, the following examples are presented.

Example 1

In order to show the effect of stability toward alkalinity on solutions of titanium monolactate containing varying amounts of sorbitol, the following solutions were prepared. Varying amounts of sorbitol were added to aqueous solutions of titanium monolactate containing 0.8 mole of titanium monolactate per liter. The pH of these solutions was raised to 13 by the addition of 2 N aqueous sodium hydroxide. The time for hydrolysis to progress to the point of turbidity was noted. The following results were obtained:

| Sample | Moles of Sorbitol per Gram Atom of Titanium | Time Required to Develop Turbidity at pH 13 |
|---|---|---|
| Control | None | Immediately Opaque. |
| 1 | 0.1 | 2 days. |
| 2 | 0.2 | 2 weeks. |
| 3 | 0.5 | Still Clear after 4 weeks. |
| 4 | 1.0 | Do. |
| 5 | 1.5 | Do. |

The following examples are presented to show a variety of solutions prepared according to the instant invention which demonstrates the stability toward alkalinity and the resistance of the solutions to hydrolysis upon dilution and heating.

Example 2

A stabilized solution of titanium dilactate was prepared by adding 36.4 g. of sorbitol to 200 ml. of a titanium dilactate solution containing 9.6 g. of titanium and 36 g. of lactic acid. The pH of the solution was raised to 13 by the addition of 2 N aqueous potassium hydroxide. The solution remained clear and unchanged after standing three months. For comparison when the pH of the original titanium dilactate solution was raised to 13 by the alkali, without employing sorbitol, immediate hydrolysis and gelation occurred.

Further dilution of this titanium dilactate solution containing sorbitol at pH 13 did not cause hydrolysis.

Example 3

A titanium monolactate having increased resistance to hydrolysis in aqueous alkaline media was prepared by adding 1.82 g. of mannitol to 100 ml. of an aqueous solution of titanium monolactate containing 2.4 g. of titanium and 4.5 g. of lactic acid. The solution remained clear when the pH was raised to 13. The titanium monolactate solution did not become turbid or hydrolyzed on boiling. For comparison, without the mannitol present in the solution, hydrolysis occurred immediately when the pH was raised to 11 and was noticeable at the end of ½ hour at pH 9.

Example 4

The procedure of Example 3 was repeated except that 1.82 g. of dulcitol were added in place of the mannitol. The results were the same as in Example 3.

Example 5

The procedure of Example 3 was repeated except that 1.80 g. of inositol were added in place of the mannitol. The resulting solution remained clear for 24 hours after the pH was raised to 13, before evidence of hydrolysis was noticed.

Example 6

The procedure of Example 3 was again repeated except that 0.92 g. of glycerol was added in place of the mannitol. The resulting glycerol stabilized solution of titanium monolactate remained clear for 24 hours at pH 13 before hydrolyzing.

Example 7

The procedure of Example 3 was repeated except that 5.9 g. of N-methylglucamine were added in place of the mannitol. A clear yellow solution resulted which did not hydrolyze when an equal volume of 1 N aqueous sodium hydroxide solution was added.

Example 8

The procedure of Example 3 was again repeated except that 5.8 g. of methylglucoside were added in place of the mannitol. The pH of the solution was raised to 13 by the addition of alkali. The solution remained clear overnight.

Example 9

The procedure of Example 3 was repeated except that 9.9 ml. of a 50% gluconic acid solution were added in place of the mannitol. The resulting solution showed no sign of hydrolysis at pH 13 after one week.

Example 10

A titanium monolactate solution stabilized by erythritol against hydrolysis at high pH's was prepared by adding 45.5 ml. of a titanium monolactate solution containing 4.8 g. of titanium and 9.0 g. lactic acid to 186 ml. of an aqueous solution containing 12.2 g. of erythritol. Sodium hydroxide was added until the pH of the resulting solution was between 13 and 14. No sign of hydrolysis was observed at the end of one week.

Example 11

A stable alkaline solution of titanium diglycolate was prepared by the following procedure. 15.2 g. of crystalline glycolic acid were added to 28.4 g. of tetraisopropyl titanate dissolved in 25 ml. of isopropyl alcohol. After refluxing 1 hour, the crystalline titanium diglycolate was removed by filtration. 20.0 g. of the product were mixed with 1.82 g. of sorbitol and 50 ml. of water. On adding aqueous ammonia to a pH of 12, a clear solution resulted. When this procedure was repeated without sorbitol present, an opaque gel of hydrous titania was formed when the solution was made alkaline.

Example 12

A stable alkaline solution of titanium monomandelate was prepared by repeating the procedure of Example 11 except that 15.2 g. of mandelic acid were added in place of the glycolic acid. The results were the same as in Example 11 except that the mandelate containing sorbitol became slightly cloudy after two days whereas the glycolate did not. As with the glycolate, the mandelate without sorbitol hydrolyzed immediately on raising the pH to 12.

Example 13

A titanium malate solution having increased resistance to hydrolysis in very alkaline aqueous solutions was prepared by reacting 13.4 g. of malic acid with 100 ml. of an aqueous solution containing 19 g. of titanium tetrachloride and 7.2 g. of sorbitol. The pH was raised to 12 with alkali and the solution remained clear and unhydrolyzed after 3 days. When the procedure was repeated, omitting the sorbitol, the solution became cloudy and hydrolyzed at the end of 30 minutes.

Example 14

A stable, alkaline solution of titanium citrate was prepared by adding 9.7 g. of citric acid to 200 ml. of an aqueous solution containing titanyl sulfate equivalent to 2.4 g. of titanium and 3.8 g. of sorbitol. The solution was made alkaline by the addition of sodium hydroxide until a pH of 13 was reached. The solution remained clear. When this procedure was repeated without sorbitol, gelation occurred before a pH of 13 could be reached.

Example 15

A sorbitol stabilized solution of titanium tetralactate was prepared by adding 36 g. of lactic acid to 28.4 g. of tetraisopropyl titanate, followed by the addition of 100 ml. of distilled water. The isopropyl alcohol was removed by distillation leaving a clear yellow solution of titanium tetralactate. 3.64 g. of sorbitol were then added and the pH of the solution was raised to 13 by the addition of 2.0 molar aqueous sodium hydroxide. The solution remained clear. When the sodium hydroxide was added to a titanium tetralactic solution not containing the polyol, precipitation occurred immediately.

From the above description and by the examples presented, it has clearly been shown that solutions containing chelated titanium salts of alpha hydroxy acids and polyols have been prepared which are stable toward hydrolysis in aqueous alkaline media and are resistant to hydrolysis upon heating or dilution.

As previously stated these solutions are useful for many purposes in a variety of industries. In order to show an application of using these solutions in the textile industry in conjunction with the dyeing of cloth the following description is presented.

Three dye baths were prepared containing 0.06 g. of a blue direct dye for rayon cloth having a color index of Pr 71 and 0.5 g. of sodium chloride per 120 ml. To the first solution (A) were added 20 ml. of a 1 molar aqueous solution of a sorbitol stabilized titanium monolactate containing 0.5 mole of sorbitol per gram atom of titanium monolactate. To the second solution (B) were added 20 ml. of titanium monolactate. To the third solution (C) were added 20 ml. of distilled water. The pH's of all of the dye solutions were adjusted to 9.0. A 3 g. sample of delustered nylon taffeta was added to each bath and all three solutions were heated to boiling for 15 minutes. The bath containing solution (B) (i.e. containing only the titanium monolactate) hydrolyzed immediately and formed a gel on reaching the boiling point. Solution (B) therefore, had to be discarded. After boiling solutions (A) and (C) for 15 minutes, the cloth samples were removed, washed thoroughly with warm water at 50° C., rinsed and dried. The sample of cloth from solution (A) retained an even medium deep blue shade, whereas the sample from solution (C) retained practically none of the dye.

This application illustrates only one of the many uses where these alkaline aqueous stable solutions may be employed in the various industries such as textile, leather and cosmetic industries.

It has clearly been shown that the stable solutions prepared according to the instant invention are resistant to hydrolysis under alkaline conditions and are resistant to hydrolysis upon dilution or heating under alkaline conditions and down to pH as low as 5.0. According to this invention, stable solutions containing chelated titanium salts of alpha hydroxy acids and polyols have been prepared and such solutions are useful for a variety of purposes for which solutions of titanium salts of alpha hydroxy acids alone cannot be employed.

While this invention has been described and illustrated by the examples shown, it is not intended to be strictly limited thereto, and other variations and modifications may be employed within the scope of the following claims.

I claim:

1. A stable solution consisting essentially of a polyol and a chelated titanium salt of an alpha hydroxy acid, said alpha hydroxy acid being selected from the group consisting of glycolic, lactic, alpha hydroxybutyric, mandelic, malic, citric and tartaric acid, said polyol having from 3 to 8 hydroxy groups and from 3 to 8 carbon atoms, said hydroxy groups in said polyol being present on adjacent carbon atoms, said polyol being selected from the group consisting of saturated and unsubstituted polyhydroxy aliphatic alcohols, inositol, glucose, mannose, N-methylglucamine, methylglucoside and gluconic acid, said solution being stable under alkaline conditions.

2. Solution according to claim 1 in which the mole ratio of the titanium to the alpha hydroxy acid in said salt is from 1:1 to 1:4 and the mole ratio of the titanium salt to the polyol in said solution is from 1:0.1 to 1:2.

3. Solution according to claim 1 in which the chelated titanium salt of an alpha hydroxy acid employed is titanium monolactate.

4. Solution according to claim 1 in which the chelated titanium salt of an alpha hydroxy acid employed is titanium dilactate.

5. Solution according to claim 1 in which the chelated titanium salt of an alpha hydroxy acid employed is titanium citrate.

6. Solution according to claim 1 in which the polyol employed is sorbitol.

7. Solution according to claim 1 in which the polyol employed is mannitol.

8. Method for the preparation of a stable solution of a chelated titanium salt of an alpha hydroxy acid and a polyol which comprises reacting a chelated titanium salt of an alpha hydroxy acid and a polyol, said alpha hydroxy acid being selected from the group consisting of glycolic, lactic, alpha hydroxybutyric, mandelic, malic, citric and tartaric acid, said polyol having from 3 to 8 hydroxy groups and from 3 to 8 carbon atoms, said hydroxy groups in said polyol being present on adjacent carbon atoms, said polyol being selected from the group consisting of saturated and unsubstituted polyhydroxy aliphatic alcohols, inositol, glucose, mannose, N-methylglucamine, methylglucoside, and gluconic acid, the mole ratio of the titanium to the alpha hydroxy acid in said chelated titanium salt being from 1:1 to 1:4, the mole ratio of the titanium salt to the polyol being from 1:0.1 to 1:2, and adjusting the pH of said solution to at least 7.0.

References Cited in the file of this patent

UNITED STATES PATENTS 2,824,114    Bostwick _____ Feb. 18, 1958